Dec. 29, 1964 F. M. KIRR ETAL 3,163,858

ANALOG-TO-DIGITAL CONVERTER

Filed March 18, 1960 3 Sheets-Sheet 1

INVENTOR.
FREDERICK M. KIRR
CLARENCE J. KLOSTERMAN
WALTER D. SPRAY
BY

Dec. 29, 1964 F. M. KIRR ETAL 3,163,858

ANALOG-TO-DIGITAL CONVERTER

Filed March 18, 1960 3 Sheets-Sheet 2

Dec. 29, 1964 F. M. KIRR ETAL 3,163,858

ANALOG-TO-DIGITAL CONVERTER

Filed March 18, 1960 3 Sheets-Sheet 3

United States Patent Office 3,163,858
Patented Dec. 29, 1964

3,163,858

ANALOG-TO-DIGITAL CONVERTER

Frederick M. Kirr, Altadena, Clarence J. Klosterman, Tujunga, and Walter D. Spray, Glendale, Calif., assignors to General Precision, Inc., a corporation of Delaware Filed Mar. 18, 1960, Ser. No. 15,896
1 Claim. (Cl. 340—347)

This invention relates to an analog-to-digital converter and more particularly to an analog-to-digital converter or shaft-position-to-digital encoder utilizing a ball point electrical contact which can be accurately made in a very small size converter.

Previous attempts to miniaturize the standard brush type analog-to-digital converter have been unsatisfactory since it was practically impossible to economically manufacture and assemble the parts for a standard analog-to-digital converter when they were substantially reduced in size.

Briefly stated, one preferred embodiment of the present invention consists essentially of a substantially cylindrical housing with an input shaft extending axially through one open end thereof. A coded information member is rigidly mounted on the shaft for rotation therewith, and a brush block assembly is mounted in the housing adjacent the disk and has a plurality of ball point electrical contacts extending therethrough with the outer ball resiliently contacting the coded surface of the disk. A second disk may be connected to the first disk through epicyclic gearing connected to an extension of the input shaft and a second brush block assembly would then be provided. A flexible etched or printed circuit is preferably resiliently maintained in contact with the outer ends of the ball point electrical contact holders and extends out through the converter housing for reading out the digital binary information obtained from the coding on the disk for any particular shaft position.

One object of the present invention is to provide an improved analog-to-digital converter which may be readily and accurately manufactured in very small sizes.

Another object of the present invention is to provide an improved construction of an analog-to-digital converter utilizing ball point electrical contacts to facilitate accurate positioning of the contacts in a brush block assembly and in relation to the coding on an information disk.

Other objects and many of the attendant advantages of this invention will be readily appreciated as the same becomes better understood by reference to the following detailed description when considered in connection with the accompanying drawings wherein.

Figure 1:
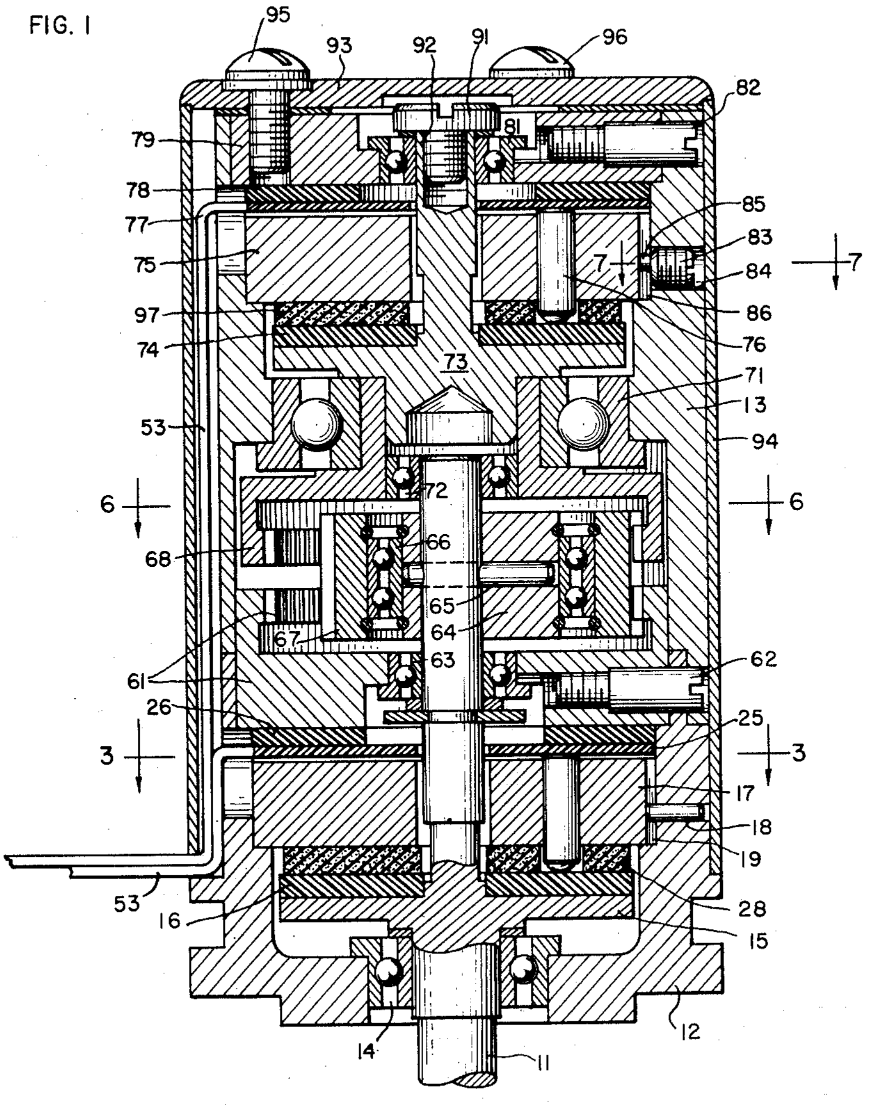
FIGURE 1 is a longitudinal sectional view taken axially through one preferred embodiment of the analog-to-digital converter of the present invention.
Figure 2:
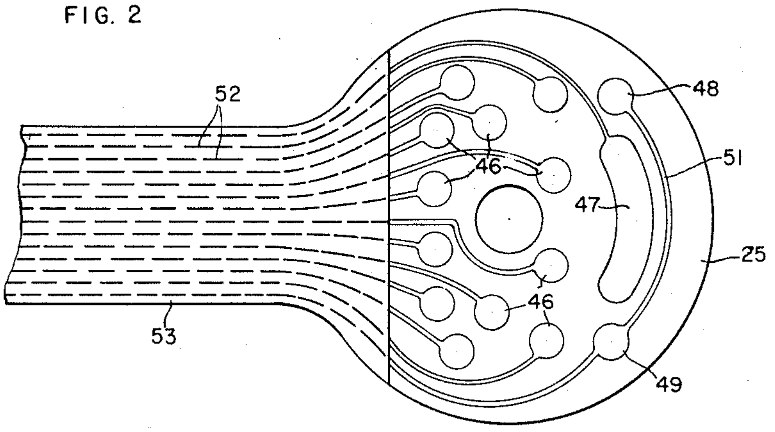
FIGURE 2 is a bottom plan view of a portion of the flexible printed or etched circuit cable of FIGURE 1.

Referring now to the drawings in detail and more particularly to FIGURE 1, one preferred embodiment of the present invention is illustrated wherein an input shaft 11 extends into the open lower end of a substantially cylindrical housing consisting of a lower housing 12 and an upper housing 13.

A ball bearing 14 supports the lower end of the input shaft 11 and is mounted in a suitable opening in the lower housing 12.

A rigid supporting disk 15 is preferably integrally formed or otherwise mounted on the input shaft 11 and supports a binary coded information disk 16 which may be adhesively or otherwise secured thereto and which is formed of insulating material with a conductive coded pattern formed in its upper surface and flush therewith.

A ball contact brush block assembly 17 is mounted in the lower housing 12 and is retained in position by a pin 18 engaging a slot 19.

Figure 3:
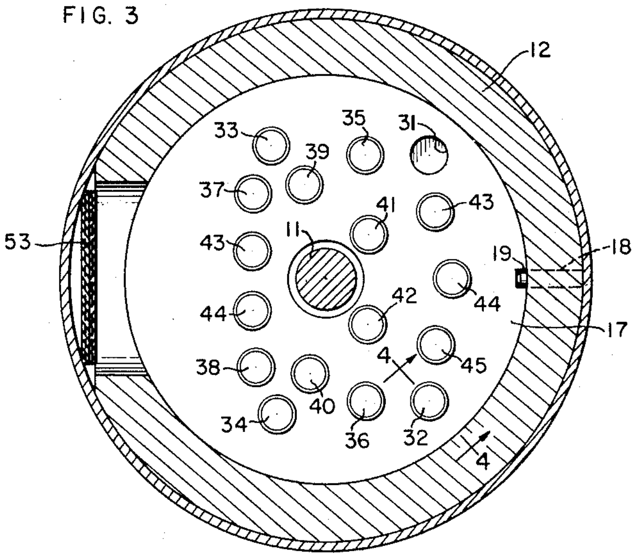
FIGURE 3 is a sectonal view taken on the line 3—3 of FIGURE 1 illustrating the brush block assembly and one particular arrangement of the ball point electrical contact holders.
Figure 4:
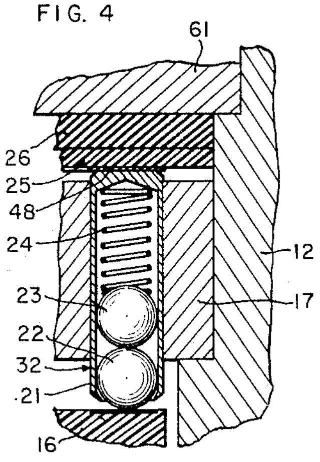
FIGURE 4 is an enlarged fragmentary sectional view taken on the line 4—4 of FIGURE 3 and illustrating the details of the ball point electrical contact and holder assembly.

The circular brush block assembly 17, as clearly illustrated in the sectional view of FIGURE 3, is provided with a plurality of symmetrically arranged axial bores each of which may be provided with a ball point electrical contact assembly, such as the one shown in detail at 32 in the enlarged view of FIGURE 4, wherein the cylindrical holder 21 is provided with a pair of spherical balls 22 and 23 which are preferably plated with gold or some similar conducting material which will not corrode. The ball 22 is resiliently maintained in contact with the coded surface of the disk 16 by means of the compression spring 24 urging the ball 23 downwardly. Spring 24 also maintains electrical contact through the upper end of the holder 21 with a conductive area on the flexible etched circuit of the cable 25, which is resiliently urged into contact with the holder 21 by the compression washer 26.

The brush block assembly 17 is preferably provided with a resilient and absorbent wiper pad 28 which may be saturated with a suitable lubricating and cleaning compound for maintaining the conductive pattern on the disk 16 clean and non-corroded to eliminate or minimize noise, and also to lubricate the balls such as 22 and 23.

Figure 5:
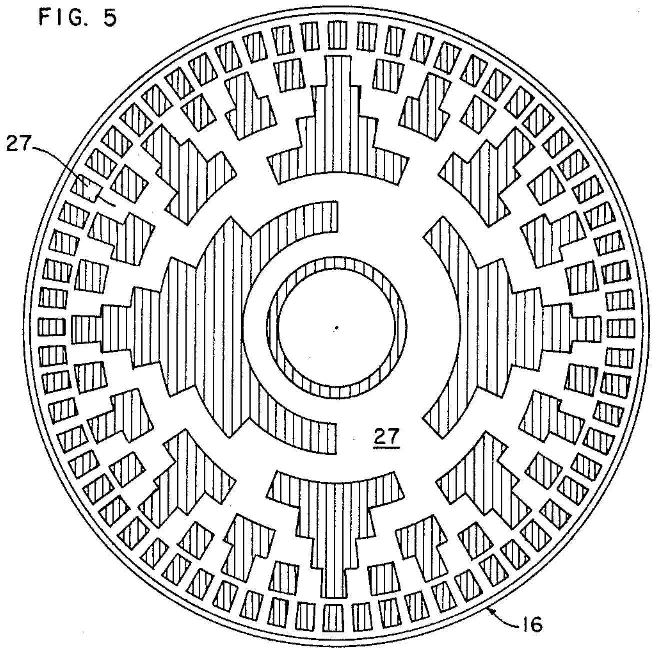
FIGURE 5 is a top plan view of the coded information disk of FIGURE 1 illustrating one particular preferred pattern.

The coded information disk 16 is formed of a suitable nonconductive material such as plastic having a conductive coded area formed on its surface and flush therewith in a pattern 27, such as that illustrated in FIGURE 5, formed of conductive material provided in the upper surface of the disk 16 and flush with the surface thereof by any suitable etching or printed circuit techniques which are commonly utilized for forming a commutator disk or coded information member for use in analog-to-digital converters. The particular binary coded symmetrical pattern illustrated in FIGURE 5 provides an optimum spacing between the alternate conductive and non-conductive segments in each of the seven tracks on the disk and the maximum width of the conductive pattern between the nonconductive areas.

The brush block assembly 17 as illustrated in FIGURE 3 has at least two bores such as the open bore 31 in each track for receiving a ball point electrical contact assembly such as the assembly 32 which is adapted to contact the alternate conductive and nonconductive segments in the outer or least significant digit track on the disk 16. Two electrical contact assemblies or readout heads 33 and 34 are provided in the next track and two more contact assemblies 35 and 36 are provided in the following track. Pairs of electrical contact assemblies 37, 38, 39, 40, 41, 42, 43 and 44 are provided for reading out the information on each of the succeeding tracks on the disk 16.

Three electrical contact assemblies 43, 44 and 45 are utilized as a common feed to supply electrical energy to the conductive pattern on the disk 16, since at least one of the balls in these assemblies will be in contact with a conductive segment at all times, as the disk is rotated.

It will be apparent that the circular conductive areas 46 on the flexible etched or printed circuit cable 25 correspond in position to the position of the electrical contact assemblies in FIGURE 3 with an arcuate conductive area 47 for the common feed to all tracks through the contact assemblies 43, 44 and 45. This portion of the cable 25 has the conductive areas exposed to contact the tops of the holders such as 21, whereas the connecting conductive strips 52 in strap 53 are insulated on both sides.

The two circular conductive areas 48 and 49 are connected by an arcuate conductive strip 51 for a purpose which will be described subsequently.

Each of the conductive areas 46, 47, 48 and 49 are connected through suitable conductive strips 52 extending through the flexible strap 53 out through the housing to suitable terminals (not shown) for connection to any desired logical readout circuitry which may include isolating diodes (not shown).

The particular arrangement of the electrical contact assemblies or readout heads illustrated in FIGURE 3 can be utilized to readout an ascending order of binary numbers for rotation of the disk in a clockwise or in a counter clockwise direction, in accordance with the teaching of the disclosure in the copending patent application of R. L. McIntyre, Serial No. 836,537, filed August 27, 1959. For rotation in one direction the contact assembly 32 is positioned as shown and for rotation in the opposite direction the contact assembly is positioned in the bore 31 to read an ascending order of binary numbers for the opposite direction of rotation. Alternatively, however, an electrical contact assembly may be positioned in each of the bores in the outer or least significant digit track at the positions indicated by the numerals 31 and 32, by eliminating the arcuate connecting strip 51 and connecting both of the conductive circular areas 48 and 49 separately through a conductive strip 52 to suitable terminals at the output end of the flexible cable 25.

It will be apparent that the structure thus far described may be utilized to provide a seven-bit converter merely by providing an end cap and bearing to support the end of a shorter input shaft 11. However, in the present embodiment the shaft 11 is extended and coupled through suitable gearing to be described to drive a second or low speed disk.

In the structure illustrated in FIGURE 1, an internal gear 61 is secured in the lower housing 12 by means of a dowel screw 62 and mounts a ball bearing 63 which rotatably supports the intermediate portion of the input shaft 11.

An epicyclic eccentric 64 is mounted and positioned on the input shaft 11 by means of a pin 65 and rotates with the shaft 11. A ball bearing 66 rotatably supports an external pinion gear 67 on the eccentric 64 and the pinion gear 67 will then revolve about the shaft 11 and roll on the internal gear 61 as well as on the internal gear 68. These two internal gears 61 and 68 have a different number of teeth so that the internal gear 68 will rotate only one revolution for a particular number of revolutions of shaft 11 and external gear 67.

Figure 6:
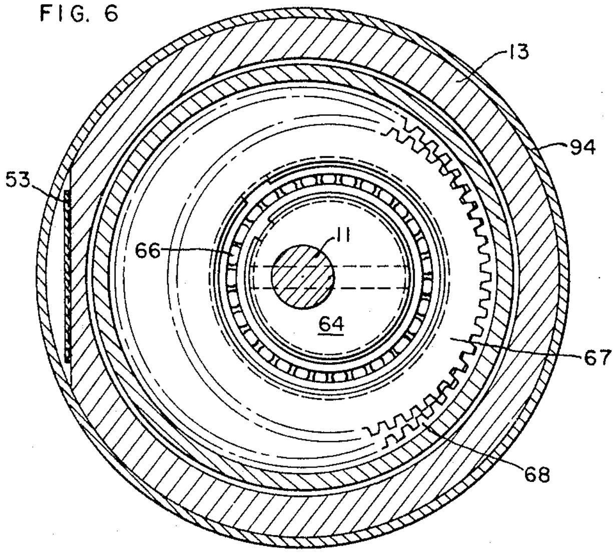
FIGURE 6 is a sectional view taken on the line 6—6 of FIGURE 1 illustrating the epicyclic gear train.
Figure 7:
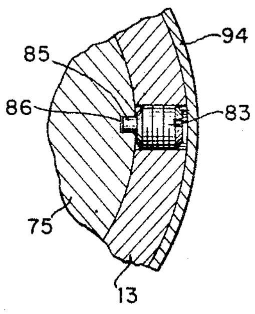
FIGURE 7 is a fragmentary sectional view taken on the line 7—7 of FIGURE 1 and illustrating one suitable means for adjusting the upper brush block for accurate alignment with the lower brush block.

For example, as illustrated more clearly in the sectional view of FIGURE 6, the external pinion gear 67 may have fifty-one teeth, the internal gear 61 may have sixty-three teeth and the internal gear 68 may have sixty-four teeth, so that internal gear 68 will make one revolution for 64 revolutions of the input shaft 11 and the external gear 67.

The upper housing 13 is provided with a ball bearing 71 to rotatably support the internal gear 68 which in turn is provided with a smaller ball bearing 72 to rotatably support the upper end of the input shaft 11 and maintain it in concentric relation with the housing and other elements in the structure.

A low speed shaft assembly 73 is rigidly secured, as by a force fit, to the internal gear 68 for rotation therewith, and supports a low speed disk 74 which is similar to the coded information disk 16. A second brush block assembly 75 is positioned adjacent to the information disk 74 and is provided with a plurality of ball point electrical contact assemblies or readout elements such as the one illustrated at 76. These contact assemblies will be positioned in a pattern similar to that illustrated in FIGURE 3, except that no contact assembly is utilized in the outer track at the positions indicated by the numerals 31 and 32 in FIGURE 3, since use of the least significant digit on the low speed disk would involve very difficult problems in alignment. Another flexible etched or printed circuit cable 77 is provided to maintain contact with the contact assemblies such as 76 in the upper or low speed brush block 75 and is maintained in contact therewith by means of a compression washer 78.

An upper bearing support 79 is provided to mount the bearing 81 for supporting the upper end of the low speed shaft assembly 73 and is maintained in position by the dowel screw 82 which extends through the upper housing 13.

An eccentric adjuster 83 is threaded through an opening 84 in the upper housing 13 and is provided with an eccentric pin 85 which engages a slot 86 in the upper brush block 75 for alignment and correct readout in correlation with the lower brush block 17.

A shaft lock screw 91 threadably engages a threaded bore 92 at the upper end of the low speed shaft assembly 73 for maintaining the associated parts in assembled relation. An end cap 93 engages a spacer sleeve 94 and is held in position by a plurality of cap screws such as those illustrated at 95 and 96.

Another resilient and absorbent pad 97 is provided on the brush block assembly 75 to lubricate and clean the disk 74 in a manner similar to that of the pad 27 in contact with the disk 16.

If only seven-bits of information are required a converter of the same diameter but substantially shorter in length can be provided by substituting the end cap and bearing support 79 for the internal gear 61 and utilizing a shorter input shaft 11 with only one coded information disk and a shorter sleeve to take the place of the spacer sleeve 94 with the same end cap 93 and screws such as 95 and 96 to hold the smaller unit in assembled relation.

It will be apparent that the structure and arrangement of the present invention lends itself to manufacture, assembly and accurate adjustment in very small sizes and has actually been built in the size 8 which is commonly accepted terminology for the size of converters and servo motors and is about the size of a quarter or ¾ of an inch in diameter and less than an inch and a half in length for a thirteen-bit converter. A converter of this size has been tested and reads out the binary information accurately at high slew speeds and over a long period of time in exhaustive life tests.

While the converter of the present invention has been built and is preferably used with a coded information disk having conductive and nonconductive segments and electrical ball point contact assemblies in the brush block assembly or readout head, it will be obvious that the same or a similar structure and arrangement could be utilized with magnetic or non-contact disks and readout heads such as those described in the copending applications of Joseph Simon for a Variable Reluctance Converter, Serial No. 791,430, filed February 5, 1959, utilizing the readout head disclosed therein or an alternative readout head described in the copending application of Pollock and Simon, Serial No. 837,712, filed September 2, 1959, for a Head for a Variable Reluctance Converter.

The magnetically coded disk and readout head disclosed in the copending application of Christensen and Frazier, Serial No. 4,481, filed January 25, 1960, might also be utilized in the present arrangement.

While the coded disk disclosed in conjunction with the present invention has been shown as a symmetrical skewed disk with a particular arrangement and disposition of the ball point electrical contact assemblies or readout heads, it will be apparent that other disk coding and suitable head dispositions may be utilized in conjunction with the present invention.

The disk 16 with its symmetrical conductive pattern, as shown in FIGURE 5, and the particular arrangement of the electrical ball point contact assemblies, as illustrated in FIGURE 3, are adapted to function in a similar manner and may use readout circuitry such as that illustrated in the copending application of Robert L. McIntyre for an Analog-Digital Converter, Serial No. 836,537, filed August 27, 1959. Although the disk pattern and head arrangement are somewhat different, they still function in a similar manner. A single brush is used in the outer track either at the position 31 or 32 of FIGURE 3 and dual brushes are selectively utilized in each of the succeeding tracks which are so arranged that one of the brushes represents a binary 1 when it engages a conductive segment, and represents a binary 0 when it engages a nonconductive segment; whereas the other brush of each pair represents a binary 0 when it engages a conductive segment, and represents a binary 1 when it engages a nonconductive segment. This particular arrangement of the brush block in combination with the disk pattern permits simplification to be obtained in the logical control circuitry associated with the disk since all switching effects exerted on the output flip-flop (not shown) are positively controlled by the engagement of a selected brush in a particular pair with a conductive segment in its associated track, and thus the flip-flop is only triggered to represent a transition from binary 0 to binary 1 or when it is triggered to represent a transition from binary 1 to binary 0. Therefore, it is possible to use only high pass logical gates in the control circuitry. This obviates the necessity to use both high pass and low pass logical gates in the control circuitry, or use an inverter circuit with the lagging brushes.

It will also be apparent that with this arrangement an ascending series of binary numbers may be read when the disks 16 and 74 are rotated in one direction but an ascending series of binary numbers may also be read in the opposite direction by making a simple change in the wiring to invert the logic of the circuitry and by utilizing a ball point electrical contact assembly in the alternate position 31 instead of the position 32.

Obviously many other modifications and variations of the present invention may be made within the scope of the following claim.

What is claimed is:

In an analog-to-digital converter having a coded information disc with a plurality of concentric circular tracks on one surface thereof with alternate conductive and nonconductive segments in each track to form a binary code representing any particular position of said member and a readout head mounted with one surface adjacent the coded surface of the disc, the improvement comprising a plurality of ball point electrical contact elements adapted to be mounted in bores extending through said readout head, each of said contact elements having a cylindrical holder open at one end and closed at the opposite end, a pair of balls mounted in the open end of said cylindrical holder and adjacent the coded surface of the information disc, a compression spring engaging the closed end of said holder and resiliently urging said balls toward said open end with the outer one of said balls in contact with the coded surface of the disc, a flexible circuit having conductive areas corresponding to and contacting the other end of said contact elements and conductive strips extending outwardly from each of said conductive areas, and resilient means for urging said flexible circuit against said holders, said resilient means adapted to establish electrical continuity between a conductive segment on said information disc and a conductive strip on said flexible circuit.

References Cited in the file of this patent

UNITED STATES PATENTS

| | | |
|---|---|---|
| 705,839 | Henderson | July 29, 1902 |
| 2,582,336 | Koza | Jan. 15, 1952 |
| 2,591,555 | Klopf | Apr. 1, 1952 |
| 2,713,680 | Ackerlind | July 19, 1955 |
| 2,766,445 | Bland | Oct. 9, 1956 |
| 2,958,860 | Petherick | Nov. 1, 1960 |
| 2,975,409 | Petherick | Mar. 14, 1961 |
| 2,977,582 | Wolman | Mar. 28, 1961 |
| 3,022,500 | Stupar | Feb. 20, 1962 |

OTHER REFERENCES

"Notes on Analog-Digital Conversion Techniques," Edited by A. K. Susskin, The Technology Press M.I.T., 1957, Chapter V, coding and decoding tech.